United States Patent
Baik et al.

(10) Patent No.: US 11,894,192 B2
(45) Date of Patent: Feb. 6, 2024

(54) MULTILAYER CERAMIC ELECTRONIC COMPONENT

(71) Applicant: SAMSUNG ELECTRO-MECHANICS CO., LTD., Suwon-si (KR)

(72) Inventors: Seung In Baik, Suwon-si (KR); Hee Sun Chun, Suwon-si (KR); Jae Sung Park, Suwon-si (KR); Hyoung Uk Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 174 days.

(21) Appl. No.: 17/466,458

(22) Filed: Sep. 3, 2021

(65) Prior Publication Data
US 2022/0270822 A1    Aug. 25, 2022

(30) Foreign Application Priority Data
Feb. 24, 2021    (KR) .................. 10-2021-0024911

(51) Int. Cl.
*H01G 4/12*    (2006.01)
*H01G 4/30*    (2006.01)
(Continued)

(52) U.S. Cl.
CPC ....... *H01G 4/1227* (2013.01); *C04B 35/4682* (2013.01); *H01G 4/30* (2013.01); *H01G 4/008* (2013.01)

(58) Field of Classification Search
CPC .... C04B 35/4682; H01G 4/1227; H01G 4/30; H01G 4/008; H01G 4/005
(Continued)

(56) References Cited

U.S. PATENT DOCUMENTS

| 2007/0230088 A1* | 10/2007 | Fujimura | .............. C04B 35/638 257/E21.082 |
| 2009/0073635 A1* | 3/2009 | Taniguchi | ............ H01G 4/1227 156/89.12 |

(Continued)

FOREIGN PATENT DOCUMENTS

| JP | 2007-201278 A | 8/2007 |
| JP | WO2008/010412 A1 | 1/2008 |

(Continued)

*Primary Examiner* — Arun Ramaswamy
(74) *Attorney, Agent, or Firm* — Morgan, Lewis & Bockius LLP

(57) ABSTRACT

A multilayer ceramic electronic component includes: a ceramic body including a dielectric layer having a main component represented by $(Ba_{1-x}Ca_x)(Ti_{1-y}(Zr, Sn, Hf)_y)O_3$ (where, $0 \leq x \leq 1$, $0 \leq y \leq 0.5$), and having a plurality of grains and grain boundaries disposed between the plurality of grains, and including first and second internal electrodes alternately stacked with the dielectric layer interposed therebetween; a first external electrode; and a second external electrode, wherein the dielectric layer includes a triple point in contact with three grain boundaries and a secondary phase of Si disposed inside the triple point, wherein a dispersion of an Si content at an interface between the dielectric layer and the internal electrode may be 1% by weight or less.

29 Claims, 12 Drawing Sheets
(2 of 12 Drawing Sheet(s) Filed in Color)

(51) Int. Cl.
*H01G 4/008*    (2006.01)
*C04B 35/468*   (2006.01)

(58) Field of Classification Search
USPC ..... 361/301.4, 321.1, 321.2, 321.5, 311, 303
See application file for complete search history.

(56) References Cited

U.S. PATENT DOCUMENTS

| | | |
|---|---|---|
| 2009/0128990 A1 | 5/2009 | Inoue et al. |
| 2010/0195260 A1 | 8/2010 | Ishihara |
| 2011/0164346 A1* | 7/2011 | Tamura ................. C04B 35/638 |
| | | 361/321.1 |
| 2014/0177133 A1* | 6/2014 | Lee ...................... H01G 4/1209 |
| | | 361/321.4 |
| 2016/0155571 A1* | 6/2016 | Doi .......................... H01G 4/12 |
| | | 156/89.16 |
| 2019/0051460 A1* | 2/2019 | Kawamura .............. H01G 4/30 |
| 2019/0135701 A1* | 5/2019 | Yun ...................... H01G 4/1236 |
| 2020/0051748 A1* | 2/2020 | Park ..................... H01G 4/1227 |
| 2020/0303126 A1* | 9/2020 | Cha ...................... H01G 4/0085 |

FOREIGN PATENT DOCUMENTS

| | | | |
|---|---|---|---|
| JP | 2010-173900 A | | 8/2010 |
| JP | 2012028683 A | * | 2/2012 |

\* cited by examiner

MULTILAYER CERAMIC ELECTRONIC COMPONENT

CROSS-REFERENCE TO RELATED APPLICATION(S)

This application claims the benefit of priority to Korean Patent Application No. 10-2021-0024911 filed on Feb. 24, 2021 in the Korean Intellectual Property Office, the disclosure of which is incorporated herein by reference in its entirety.

TECHNICAL FIELD

The present disclosure relates to a multilayer ceramic electronic component.

BACKGROUND

In recent years, according to the trend for the miniaturization of electronic products, multilayer ceramic electronic components have also been required to be miniaturized and to have high capacitance. Dielectric sheets of multilayer ceramic electronic components are also becoming thinner to meet the demand for miniaturization and high capacitance in multilayer ceramic electronic components.

Meanwhile, it is known that withstand voltage characteristics of electronic components are greatly affected by a microstructure inside a component. As the dielectric sheet becomes thinner, the size of grains and dispersion of components of the dielectric layer are affected, and the withstand voltage and reliability characteristics of the chip are deteriorated. In general, since grain boundaries between grains of an electronic component have a high resistance component, research has been conducted to provide an electronic component having high reliability by increasing a ratio of grain boundaries inside a dielectric layer.

However, problems such as deterioration of product reliability, high-temperature, high-pressure characteristics, and insulation resistance characteristics still exist due to thinning of the dielectric layer due to the ultra-miniaturization/ultra-high capacitance of electronic components.

SUMMARY

An aspect of the present disclosure is to provide a multilayer ceramic electronic component having excellent high temperature and high pressure characteristics.

An aspect of the present disclosure is to provide a multilayer ceramic electronic component capable of controlling a secondary phase while having excellent uniformity of a microstructure of a dielectric layer.

One of the various objects of the present disclosure is to improve insulation resistance characteristics of a multilayer ceramic electronic component.

An aspect of the present disclosure is to provide a multilayer ceramic electronic component having improved reliability.

According to an aspect of the present disclosure, a multilayer ceramic electronic component includes: a ceramic body including a dielectric layer having a main component represented by $(Ba_{1-x}Ca_x)(Ti_{1-y}(Zr, Sn, Hf)_y)O_3$ (where, $0 \leq x \leq 1$, $0 \leq y \leq 0.5$), and having a plurality of grains and grain boundaries disposed between the plurality of grains, and including first and second internal electrodes alternately stacked with the dielectric layer interposed therebetween; a first external electrode connected to the first internal electrode; and a second external electrode connected to the second internal electrode, wherein the dielectric layer includes a triple point disposed in contact with three grain boundaries, and a secondary phase of Si disposed inside the triple point, wherein a dispersion of an Si content at an interface between the dielectric layer and the internal electrode may be 1% by weight or less.

According to another aspect of the present disclosure, a multilayer ceramic electronic component, includes: a ceramic body including: a dielectric layer including a main component, and a plurality of grains with grain boundaries disposed between the plurality of grains; and first and second internal electrodes alternately stacked with the dielectric layer interposed therebetween, wherein the dielectric layer comprises a triple point disposed in contact with three grain boundaries and a secondary phase of Si disposed inside the triple point, wherein a dispersion of an Si content at an interface between the dielectric layer and the internal electrode is 1% by weight or less.

According to another aspect of the present disclosure, a multilayer ceramic electronic component, includes: a ceramic body including a dielectric layer including a main component, and a plurality of grains with grain boundaries disposed between the plurality of grains, and first and second internal electrodes alternately stacked with the dielectric layer interposed therebetween, wherein the dielectric layer comprises a triple point disposed in contact with three grain boundaries and a secondary phase of Si disposed inside the triple point, and wherein a ratio (b/a) of an average Si content (b) of the triple point to an average Si content (a) inside a grain of the plurality of grains is within a range of exceeding 3 and/or less than 6.

BRIEF DESCRIPTION OF DRAWINGS

The patent or patent application file contains at least one drawing executed in color. Copies of this patent or patent application publication with color drawing(s) will be provided by the Office upon request and payment of the necessary fee.

The above and other aspects, features, and advantages of the present disclosure will be more clearly understood from the following detailed description, taken in conjunction with the accompanying drawings, in which.

DETAILED DESCRIPTION

Figure 1:
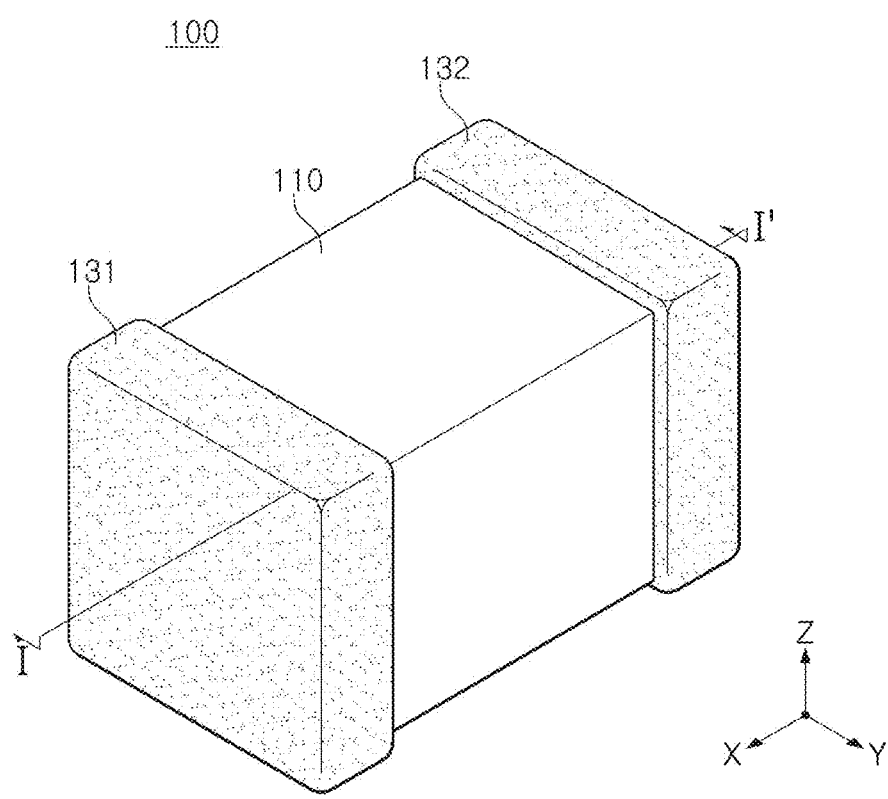
FIG. 1 is a perspective view schematically illustrating a multilayer ceramic electronic component according to an embodiment of the present disclosure.

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

In the present specification, expressions such as "having", "may have", "include" or "may include" may indicate a presence of corresponding features (e.g., components such as numerical values, functions, operations, components, or the like), and may not exclude a presence of additional features.

In the present specification, expressions such as "A or B", "at least one of A or/and B" or "one or more of A or/and B", and the like, may include all possible combinations of items listed together. For example, "A or B", or "at least one of A or B" may refer to all cases including (1) at least one A (2) at least one B, or (3) both at least one A and at least one B.

In the drawings, an X direction may be defined as a first direction, an L direction, or a length direction, a Y direction may be defined as a second direction, a W direction, or a width direction, and a Z direction may be defined as a third direction, a T direction, or a thickness direction.

Figure 2:
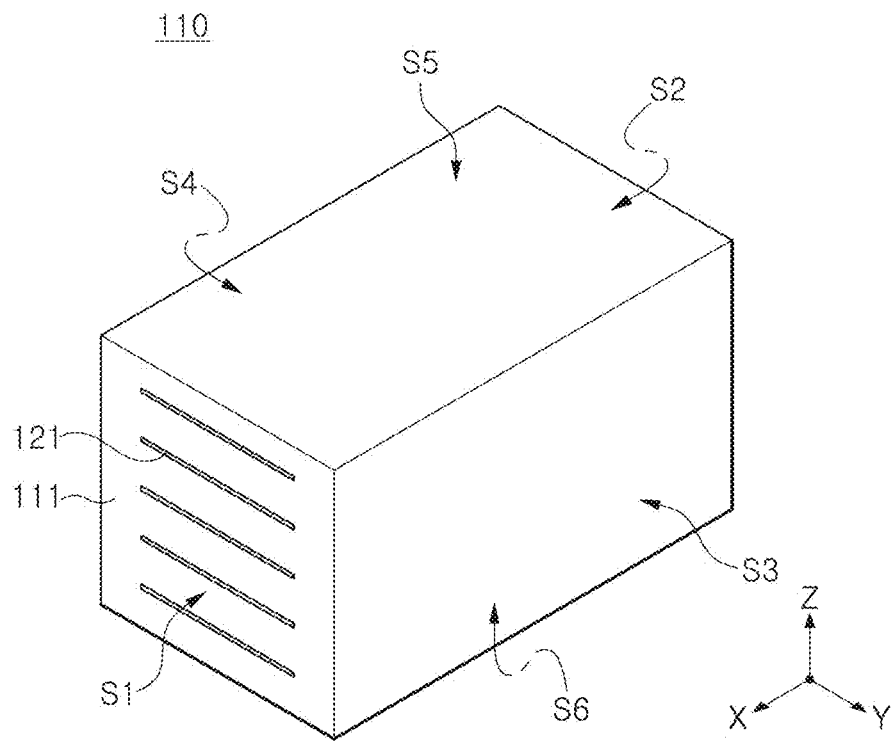
FIG. 2 is a perspective view schematically illustrating the ceramic body of FIG. 1.
Figure 3:
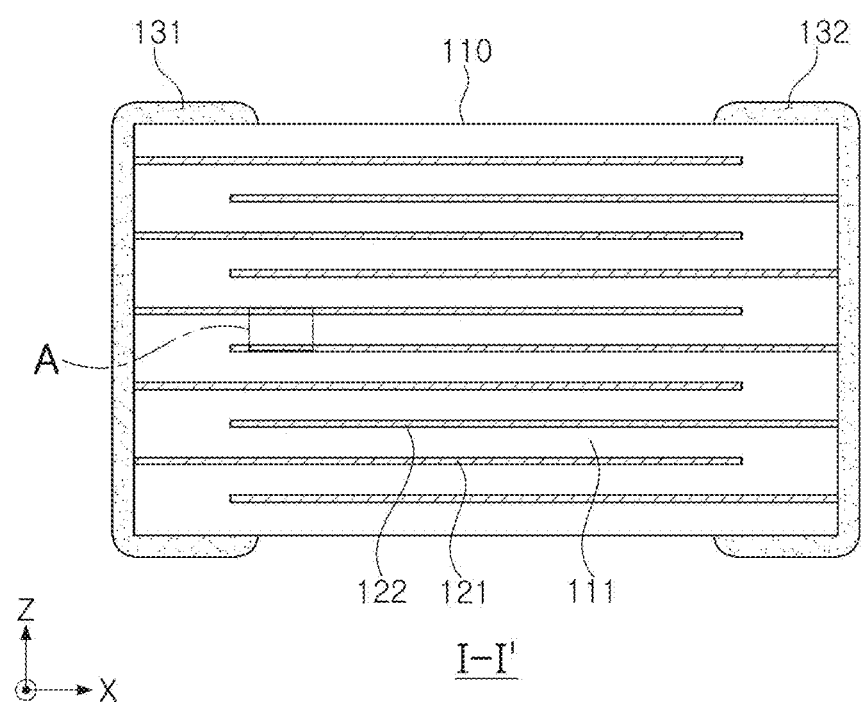
FIG. 3 is a cross-sectional view taken along line I-I' of FIG. 1.
Figure 4:
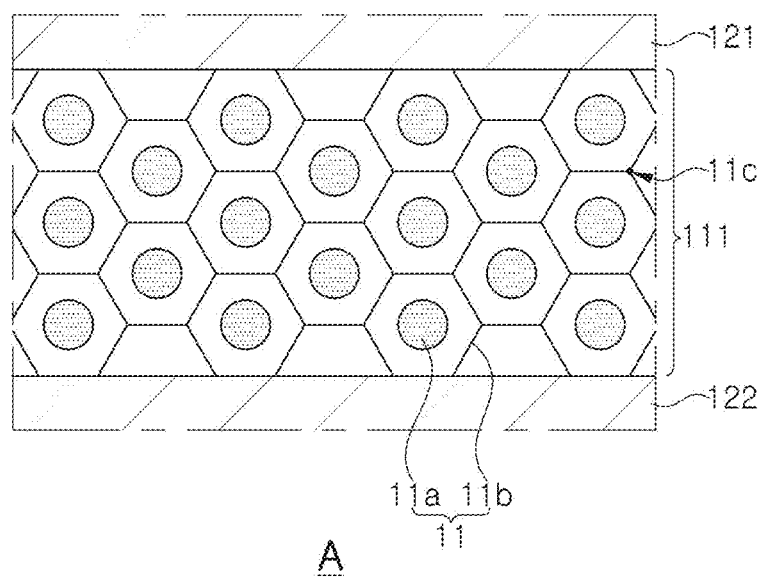
FIG. 4 is an enlarged view of area A of FIG. 3.
Figure 5A:
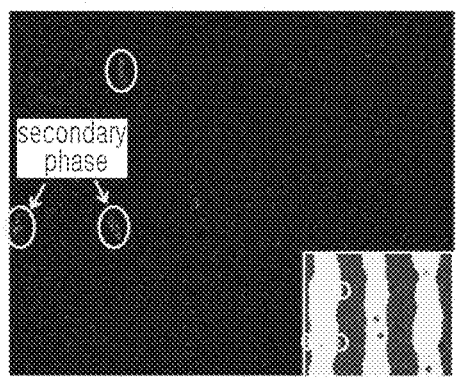
FIGS. 5A and 5B are energy dispersive spectroscopy (EDS) mapping image of Mg at an interface between an internal electrode and a dielectric of Comparative Example (a) and Example (b)
Figure 5B:
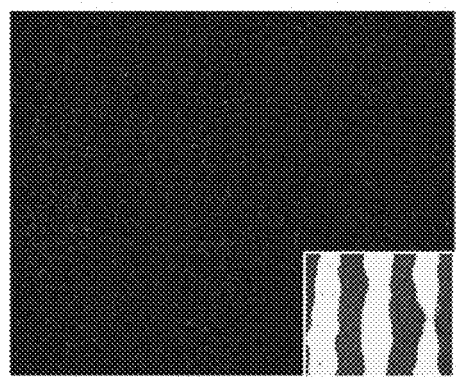

FIG. 1 is a perspective view schematically illustrating a multilayer ceramic electronic component according to an embodiment of the present disclosure, FIG. 2 is a perspective view schematically illustrating the ceramic body of FIG. 1, and FIG. 3 is a cross-sectional view taken along line I-I' of FIG. 1. FIG. 4 is an enlarged view of area A of FIG. 3.

Hereinafter, a multilayer ceramic electronic component according to an embodiment of the present disclosure will be described in detail with reference to FIGS. 1 to 4.

Referring to FIGS. 1 to 4, a multilayer ceramic electronic component 100 according to an embodiment of the present disclosure may include a ceramic body 110 including a dielectric layer having a main component represented by $(Ba_{1-x}Ca_x)(Ti_{1-y}(Zr, Sn, Hf)_y)O_3$ (where, $0 \leq x \leq 1$, $0 \leq y \leq 0.5$), and having a plurality of grains 11 and a grain boundary 11b disposed between the plurality of grains 11, and including first and second internal electrodes 121 and 122 alternately stacked with the dielectric layer 111 interposed therebetween; a first external electrode 131 connected to the first internal electrode 121; and a second external electrode 132 connected to the second internal electrode 122.

Figure 6A:
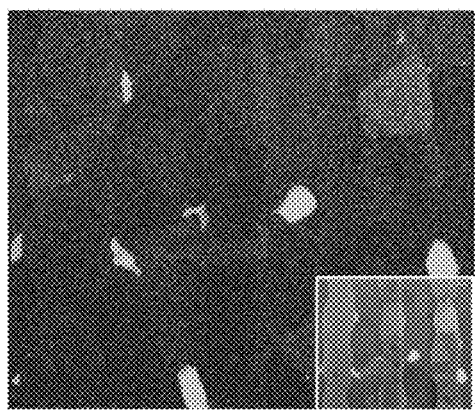
FIGS. 6A and 6B are energy dispersive spectroscopy (EDS) mapping image of Si at an interface between an internal electrode and a dielectric of Comparative Example (a) and Example (b)
Figure 6B:
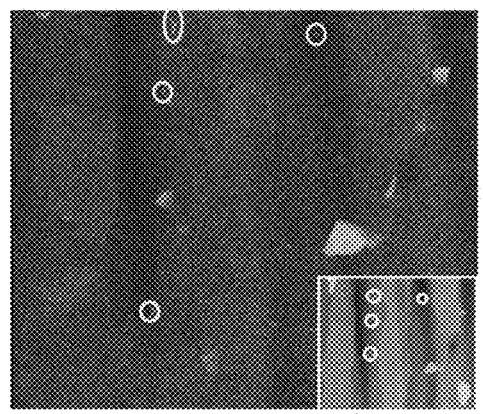

In this case, the dielectric layer 111 may include a triple point 11c disposed in contact with the three grain boundaries 11b and a secondary phase of Si disposed inside the triple point 11c. In addition, a dispersion of the Si content at an interface between the dielectric layer 111 and the internal electrodes 121 and 122 may be 1% by weight or less. In the present specification, a term "triple point" may refer to a point at which three grain boundaries meet, and a term "dispersion" of an Si content in the present specification may refer to, in a cut plane passing through a center of multilayer ceramic electronic component and being perpendicular to an Y axis, a standard deviation of the Si content measured for 10 interfaces vertically from the center. FIG. 6 is an image showing a result of EDS mapping of Si in a dielectric layer. Referring to FIG. 6, it can be seen that Si is not disposed within a triple point in the conventional Comparative example (a), but in the multilayer ceramic electronic component (b) according to an embodiment of the present disclosure, it can be seen that a secondary phase of Si is distributed at the triple point of the dielectric layer. In the multilayer ceramic electronic component according to the present disclosure, insulation resistance to grain boundaries may be improved through a structure in which a secondary phase of Si is disposed at a triple point of a dielectric layer.

A dispersion of the Si content at the interface between the dielectric layer and the internal electrode may be 1.0% by weight or less, 0.9% by weight or less, 0.8% by weight or less, 0.7% by weight or less, 0.6% by weight or less, or 0.5% by weight or less, and a lower limit thereof is not particularly limited, but may be, for example, 0% by weight or more or more than 0% by weight. Since the dispersion of Si content at the interface between the dielectric layer and the internal electrode satisfies the above range, a frequency of occurrence of the secondary phase may be reduced by improving wettability of subcomponents of the interface between the dielectric and the internal electrode, thereby further improving reliability of the multilayer ceramic electronic component.

The multilayer ceramic electronic component 100 according to an embodiment of the present disclosure may include a ceramic body 110 including a dielectric layer 111 and first and second internal electrodes 121 and 122 alternately stacked with the dielectric layer 111 interposed therebetween.

The ceramic body 110 may include first and second surfaces S1 and S2 opposing in a first direction (X direction), and third and fourth surfaces S3 and S4 opposing in a second direction (Y direction), and fifth and sixth surfaces S5 and S6 opposing in a third direction (Z direction).

There is no particular limitation on the specific shape of the ceramic body 110, but as shown, the ceramic body 110 may have a hexahedral shape or a similar shape. Due to shrinkage of the ceramic powder included in the ceramic body 110 during a sintering process, the ceramic body 110 may have a substantially hexahedral shape although not a hexahedral shape having a complete straight line. If necessary, the ceramic body 110 may be rounding processed so that corners are not angled. The rounding process may use, for example, barrel polishing, but is not limited thereto.

In the ceramic body 110, a dielectric layer 111, a first internal electrode 121, and a second internal electrode 122 may be alternately stacked. The dielectric layer 111, the first internal electrode 121, and the second internal electrode 122 may be stacked in a third direction (Z direction). The plurality of dielectric layers 111 are in a sintered state, a boundary between the adjacent dielectric layers 111 may be integrated to such an extent that it is difficult to determine without using a scanning electron microscope (SEM).

In one example, the dielectric layer 111 may include a main component and a subcomponent, and the subcomponent may include at least one or more of first to sixth subcomponents. In the present specification, a term "main component" may refer to a component occupying a relatively large weight ratio compared to other components, and may refer to a component that is 50% by weight or more based on the weight of the entire composition or the entire dielectric layer. In addition, a term "subcomponent" may refer to a component occupying a relatively small weight ratio compared to other components, and may refer to a component that is less than 50% by weight based on the weight of the entire composition or the entire dielectric layer.

Hereinafter, each component of the dielectric layer according to an embodiment of the present disclosure will be described in more detail.

a) Main Component

The main component may be a component represented by $(Ba_{1-x}Ca_x)(Ti_{1-y}(Zr, Sn, Hf)_y)O_3$ (where, $0 \leq x \leq 1$, $0 \leq y \leq 0.5$). The main component may be, for example, a chemical in which Ca, Zr, Sn and/or Hf are partially dissolved in $BaTiO_3$. In the above compositional formula, x may be in a range of 0 or more and 1 or less, and y may be in a range of 0 or more and 0.5 or less, but is not limited thereto. For example, when x is 0, y is 0, and z is 0 in the above compositional formula, the main component may be $BaTiO_3$.

b) First Subcomponent

According to an embodiment of the present disclosure, a dielectric layer of the multilayer ceramic electronic component according to the present disclosure may include a first subcomponent including one or more of Y, Dy, Ho, Er, Gd, Ce, Nd, Sm, Tb, Eu, Tm, La, Lu, and Yb.

The first subcomponent may be included in a range of 0.2 mole parts or more and/or 5.4 mole parts or less with respect to total 100 moles of a B site element of the main component. A content of the first subcomponent may be based on a content of at least one or more of Y, Dy, Ho, Er, Gd, Ce, Nd, Sm, Tb, Tm, La and Yb included in the first subcomponent without distinguishing an addition form such as an oxide or a carbonate.

The first subcomponent serves to prevent reliability of the multilayer ceramic electronic component from being deteriorated. When the first subcomponent is outside of the above-described range, high-temperature withstand voltage characteristics may be deteriorated.

In one example, a region in which the first subcomponent of the multilayer ceramic electronic component according to the present disclosure has a maximum may be disposed within the grain boundary. The region in which the first subcomponent having a maximum content may refer to that a concentration of the first subcomponent is maximum, and may mean that the concentration of the first subcomponent of the dielectric layer of the multilayer ceramic electronic component is maximum.

A region in which the first subcomponent has a maximum content in the dielectric layer may be disposed within the aforementioned triple point, for example. That is, a maximum value of the concentration of the first subcomponent in the dielectric layer can be observed at the triple point.

The first subcomponent may be substituted on an A site and/or a B site of a perovskite compound having an $ABO_3$ structure to suppress generation of oxygen vacancies, thereby implementing high insulation resistance. In the present specification, "oxygen vacancy" refers to a void caused by the escape of oxygen in a place where oxygen should exist in a certain compound. For example, when barium titanate ($BaTiO_3$) having a perovskite structure ($ABO_3$) is sintered in a reducing atmosphere, some of the oxygen contained in the barium titanate ($BaTiO_3$) is reduced and oxygen is separated from the barium titanate ($BaTiO_3$). In this case, a void where oxygen is released becomes an oxygen vacancy having ionic conductivity. Since such oxygen vacancies cause deterioration of electrical characteristics such as a decrease in insulation properties, it is important to suppress the generation of oxygen vacancies in a multilayer ceramic electronic component having a thin thickness. In the multilayer ceramic electronic component according to the present disclosure, the generation of oxygen vacancies can be effectively suppressed by controlling a region in which the first subcomponent has the maximum content in the dielectric layer as described above, thereby improving reliability of a product.

c) Second Subcomponent

According to an embodiment of the present disclosure, a dielectric layer of a multilayer ceramic electronic component of the present disclosure may include a second subcomponent including Mg.

The second subcomponent may function as a fixed-valence acceptor element, and may be included in a range of 0.25 mole parts or more and/or 1.0 mole parts or less with respect to the total 100 moles of B-site elements of the main component. A content of the second subcomponent may be based on a content of the Mg element included in the second subcomponent without distinguishing an addition form such as an oxide or a carbonate.

When the content of the second subcomponent exceeds 1.0 mole part with respect to the total of 100 moles of the B-site element as the main component, a problem of lowering a dielectric constant and lowering a high-temperature withstand voltage characteristic may occur.

In an embodiment of the present disclosure, a dielectric layer 111 of the multilayer ceramic electronic component 100 according to the present disclosure may include a plurality of grains 11 including the aforementioned main component and a grain boundary 11c disposed between the two or more grains 11. FIG. 4 is a schematic diagram for explaining a microstructure of a dielectric layer according to an embodiment of the present disclosure. The dielectric according to the present disclosure may be formed by sintering the above-described main component and subcomponent, and the dielectric material 111 formed by sintering the main and subcomponents may include a grain 11 and a grain boundary 11b. In addition, it may include a triple point at which three grain boundaries meet.

In one example, the grain 11 may have a core-shell structure. In the core-shell structure, a shell portion 11b may be disposed to surround the core portion 11a. Referring to FIG. 4, the grain 11 may have a core portion 11a disposed inside the shell portion 11. The core portion 11a may refer to a region in which a subcomponent is not dissolved, and the shell portion 11b may refer to a region other than the core portion 11a. The core portion 11a and the shell portion 11b can be distinguished by analyzing a TEM-EDS image of the cut surface.

In an embodiment of the present disclosure, a ratio (b/a) of an average Si content (b) of the triple point to an average Si content (a) inside the grain of the dielectric layer of the multilayer ceramic electronic component may exceed 3 and/or may be within a range of less than 6. The average Si content (b) of the triple point may refer to an arithmetic average of the Si content of a sample collected at a point at which the dispersion of the above-described Si content is obtained, and the average Si content (a) in the grain is the triple point may refer to an arithmetic average of the Si content of the sample collected with respect to an inside of the grain, in contact with the triple point. The dispersion of Si, a high-resistance component, may be controlled by making the ratio (b/a) of the average Si content (b) of the triple point with respect to the average Si content (a) in the grain of the dielectric layer satisfy the above-range, thereby, a multilayer ceramic electronic component having excellent high voltage reliability may be implemented.

In one example, an average particle diameter of the grain of the dielectric layer of the multilayer ceramic electronic component according to the present disclosure may be 300 nm or less. In a cut plane, perpendicular to an Y axis and passing through a center of the multilayer ceramic electronic component, an average diameter of the grain may be an arithmetic average of values measured at 10 locations at equal intervals in an X axis direction with respect to a dielectric layer, closest to the center. A measurement diameter of the grain may refer to an average value calculated through an image analysis program (Mediacybernetics' Image Pro Plus ver 4.5) after an image of cut sections of the electronic component is captured using an optical device such as a scanning electron microscope (SEM, Jeol's JSM-7400F).

In an embodiment of the present disclosure, an average thickness of the dielectric layer 111 may be 0.5 um or less. The average thickness of the dielectric layer 111 may be an average of values measured at five different locations between the first and second internal electrodes of the sintered dielectric layer 111. A lower limit of the average thickness of the dielectric layer 111 is not particularly limited, but may be, for example, 0.01 um or more.

The dielectric layer 111 may be formed by adding an additive to a slurry containing the above-described material, and applying and drying the same on a carrier film to prepare a plurality of ceramic sheets. The ceramic sheet may be formed by manufacturing the slurry in a sheet shape having a thickness of several μms by a doctor blade method, but is not limited thereto.

In one example of the present disclosure, the first and second internal electrodes 121 and 122 of the multilayer ceramic electronic component 100 may be stacked so that respective cross-sections are exposed to opposite end portions of the ceramic body 110, respectively. Specifically, the first and second internal electrodes 121 and 122 may be exposed to both surfaces of the ceramic body 110 in a first direction (X direction), respectively, and the first internal electrode 121 may be exposed in a first surface S1 direction of the ceramic body 110, and the second internal electrode 122 may be exposed in a second surface S2 direction thereof.

In one example, an average thickness of the first and second internal electrodes 121 and 122 of the multilayer ceramic electronic component 100 may be 0.5 μm or less. The average thickness of the internal electrode may be an average of values measured at five different positions of the sintered internal electrode. A lower limit of the average thickness of the first and second internal electrodes is not particularly limited, but may be, for example, 0.01 um or more.

A material of the first and second internal electrodes 121 and 122 may not be limited to any particular material, and may be formed using a conductive paste including one or more conductive metals from among silver (Ag), palladium (Pd), gold (Au), platinum (Pt), nickel (Ni), copper (Cu), tin (Sn), tungsten (W), titanium (Ti), and alloys thereof.

The ceramic body 110 may be formed by alternately laminating a ceramic green sheet on which the first internal electrode 121 is printed and a ceramic green sheet on which the second internal electrode 122 is printed on the dielectric layer third direction (Z direction). As a method of printing the first and second internal electrodes 121 and 122, a screen-printing method, a gravure printing method, or the like, may be used, but the printing method is not limited thereto.

Figure 7A:
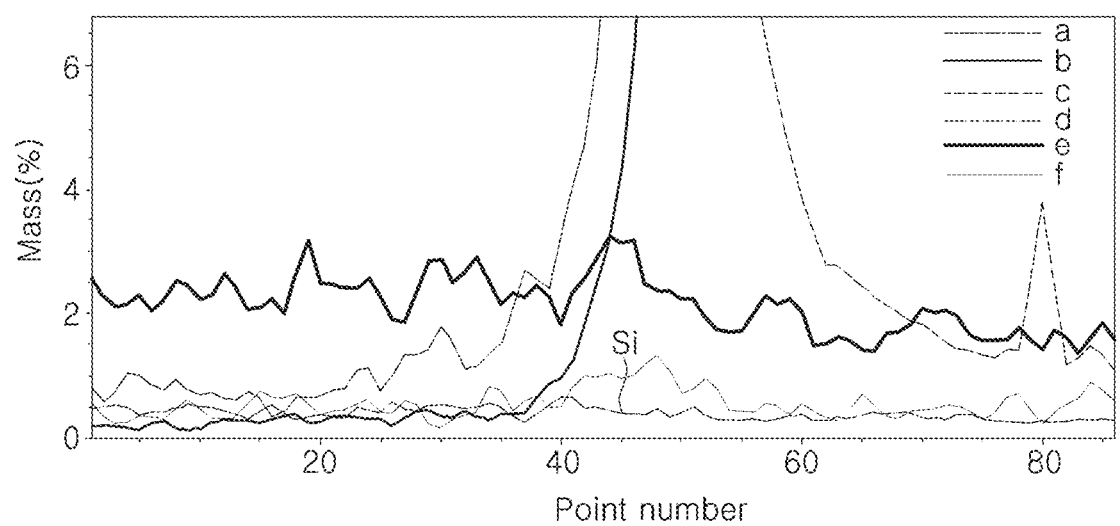
FIG. 7A is a graph illustrating a result of line profiling for energy dispersive spectroscopy (EDS) mapping at an interface between an internal electrode and a dielectric of a Comparative Example.
Figure 7B:
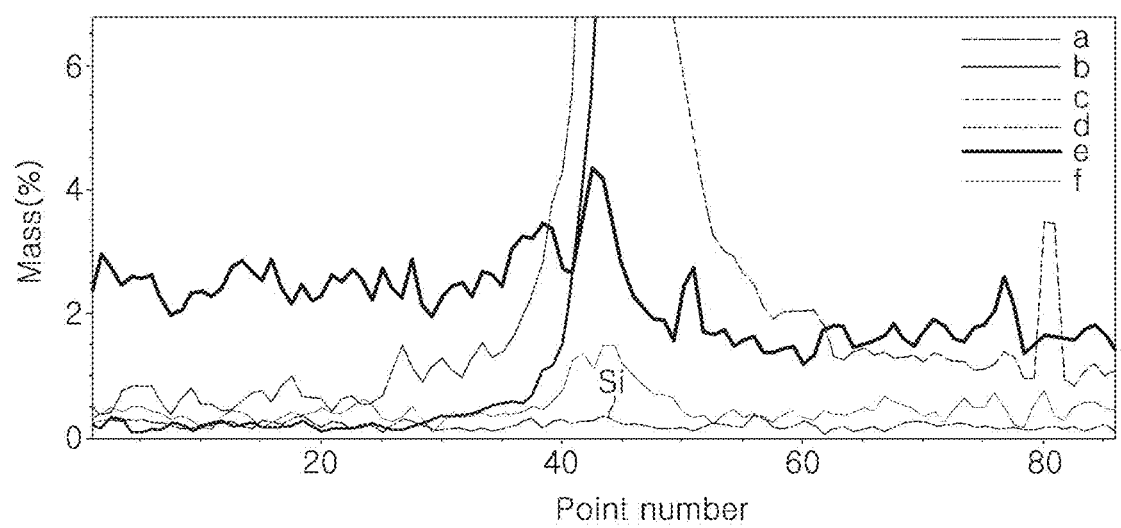
FIG. 7B is a graph illustrating a result of line profiling for energy dispersive spectroscopy (EDS) mapping at an interface between an internal electrode and a dielectric of an Example.
Figure 8A:
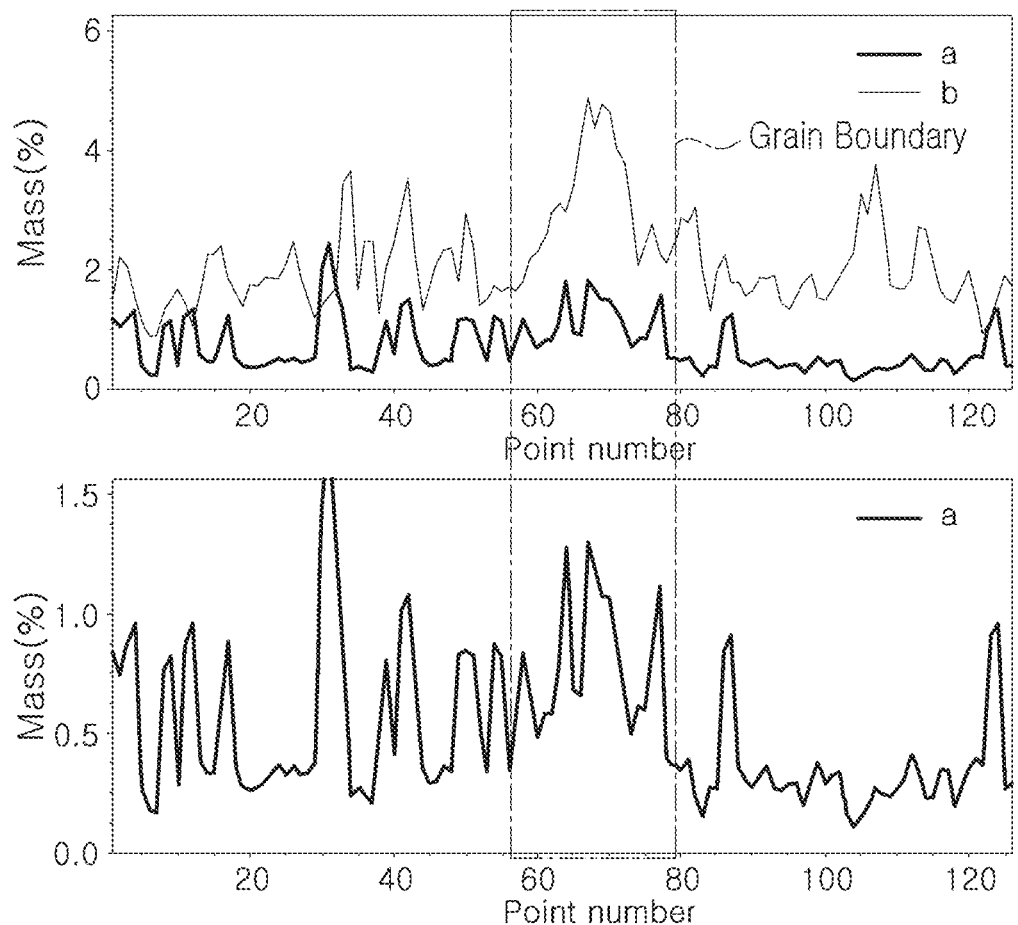
FIG. 8A is a graph illustrating a result of line profiling for energy dispersive spectroscopy (EDS) mapping at an interface between an internal electrode and a dielectric of a Comparative Example.
Figure 8B:
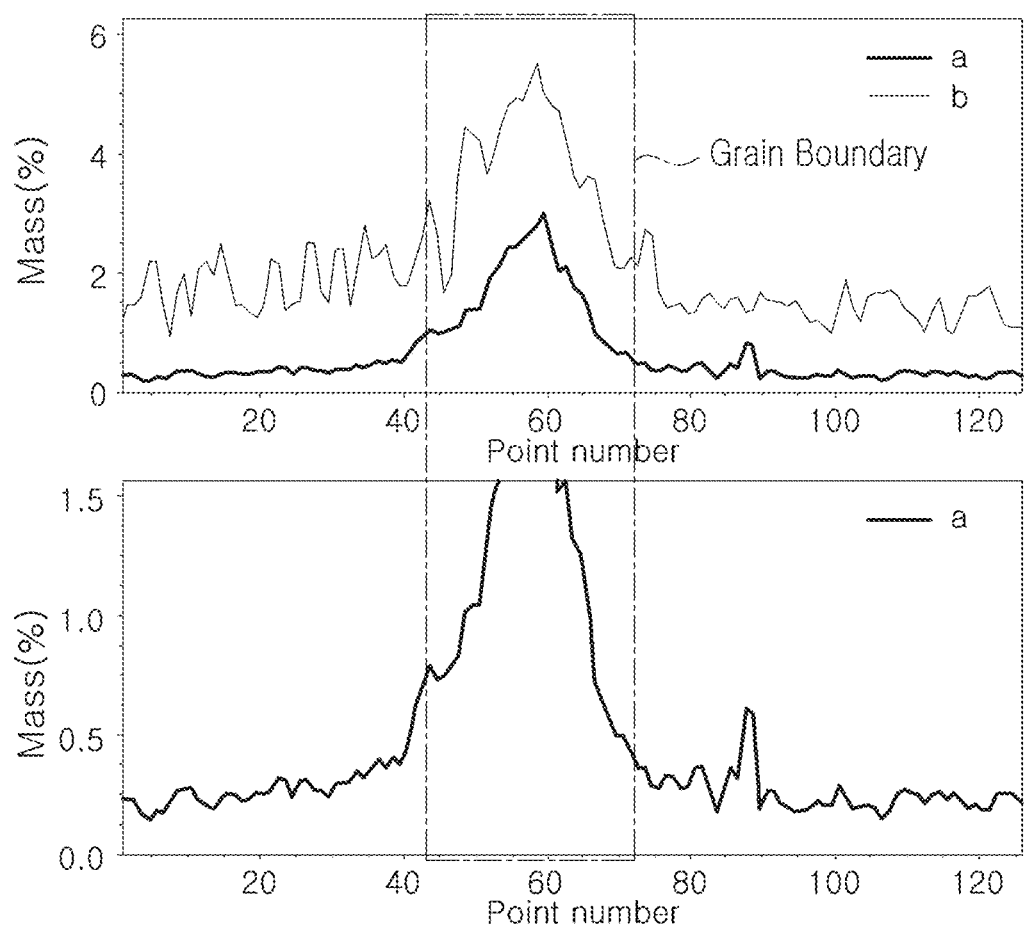
FIG. 8B is a graph illustrating a result of line profiling for energy dispersive spectroscopy (EDS) mapping at an interface between an internal electrode and a dielectric of an Example.
Figure 9A:
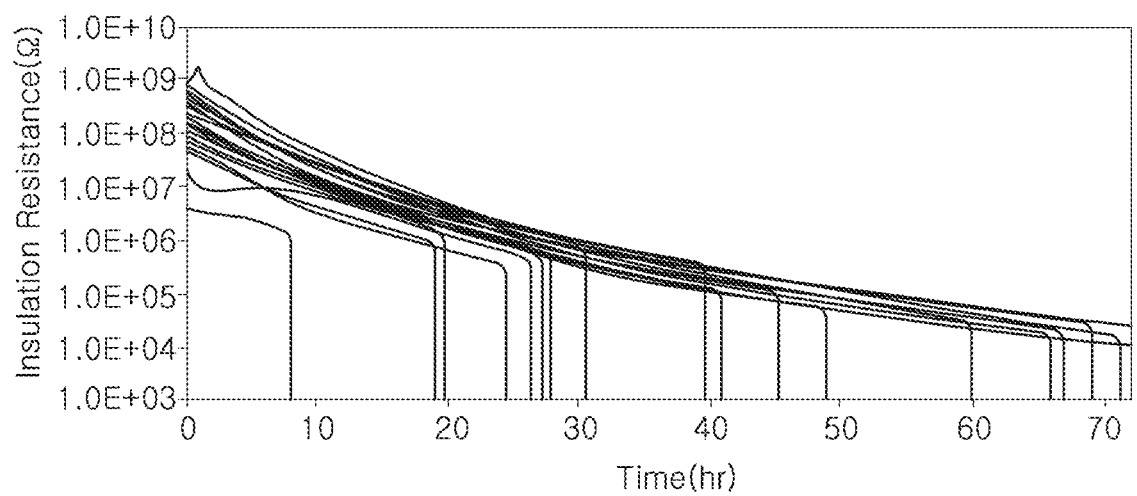
FIG. 9A is a graph illustrating a high temperature and high pressure test result for a Comparative Example.
Figure 9B:
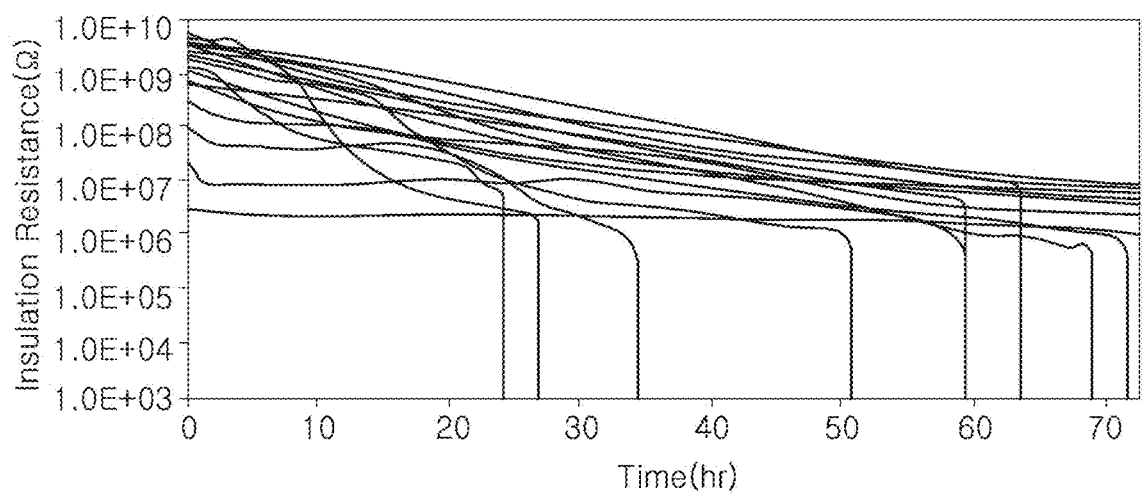
FIG. 9B is a graph illustrating a high temperature and high pressure test result for an Example.

In an embodiment of the present disclosure, an average content of the secondary phase of Si at the interface between the dielectric layer and the internal electrode of the multilayer ceramic electronic component according to the present disclosure may be 0.1 mol % or less. In the present specification, a term "interface" of the dielectric layer 111 and the first internal electrode 121 and/or the second internal electrode 122 may refer to a surface where the dielectric layer and the internal electrode are in contact, and may refer to a surface that can be observed through an SEM image, or the like. In addition, the interface may refer to a surface in which two surfaces having different constituent components are in contact with each other, and may refer to a surface that can be identified through dispersion of main components of the dielectric layer and the internal electrode. For example, referring to FIG. 7, it can be seen that the content of Ba and Ti is not detected from a predetermined position, and the content of Ni is detected from passing through the predetermined position. Thereby, it can be confirmed that an area in which Ba and Ti are distributed and an area in which Ni is distributed are clearly distinguished, and the area can be interpreted as an interface between the dielectric layer and the internal electrode.

An average content of a secondary phase of Si at the interface between the dielectric layer and the internal electrode may be 0.10 mol % or less, 0.09 mol % or less, 0.08 mol % or less, 0.07 mol % or less, 0.06 mol % or less, or 0.05 mol % or less. A lower limit of the average content of the secondary phase of Si at the interface between the dielectric layer and the internal electrode may be, for example, 0 mol % or more. When the average content of the secondary phase of Si at the interface between the dielectric layer and the internal electrode is 0 mol %, it may mean that the secondary phase of Si is not detected at the interface between the dielectric layer and the internal electrode, for example, there may be a non-detection region of the secondary phase of Si disposed at the interface between the dielectric layer and the internal electrode. The secondary phase of Si is a high resistance component and is sometimes used to improve the insulation resistance of multilayer ceramic electronic components. However, when the secondary phase of Si is disposed at the interface between the dielectric layer and the internal electrode, local electric field concentration may occur, and thus the BDV characteristics may be deteriorated. As in the present embodiment, when an average content of the secondary phase of Si at the interface between the dielectric layer and the internal electrode satisfies the above-described range, the electric field concentration phenomenon can be suppressed to improve high voltage reliability.

In one example of the present disclosure, an average content of a secondary phase of Mg at the interface between the dielectric layer and the internal electrode of the multilayer ceramic electronic component may be 0.1 mol % or less. The average content of the secondary phase of Mg at the interface between the dielectric layer and the internal electrode may be 0.10 mol % or less, 0.09 mol % or less, 0.08 mol % or less, 0.07 mol % or less, 0.06 mol % or less, or 0.05 mol % or less. A lower limit of the average content of the secondary phase of Mg at the interface between the dielectric layer and the internal electrode may be, for example, 0 mol % or more. When the average content of the secondary phase of Mg at the interface between the dielectric layer and the internal electrode is 0 mol %, it may mean that the secondary phase of Mg is not detected at the interface between the dielectric layer and the internal electrode, for example, there may be a non-detection region of the secondary phase of Mg disposed at the interface between the dielectric layer and the internal electrode. When the content of the secondary phase of Mg at the interface between the dielectric layer and the internal electrode is within the above range, a microstructure inside the dielectric layer can be uniformly formed, and the secondary phase can be controlled. When the content of the secondary phase of Mg is outside of the above range, overgrowth of the grain may be caused, thereby lowering a dielectric constant and lowering a high-temperature withstand voltage characteristic.

A region in which Sn inside the dielectric layer and/or the internal electrode has a maximum content may be disposed at an interface between the dielectric layer and the internal electrode. The region in which Sn inside the dielectric layer and/or the internal electrode has a maximum content is disposed at the interface between the dielectric layer and the internal electrode, which may mean that an average content of Sn decreases as a distance from the interface between the dielectric layer and the internal electrode decreases, and may mean that an average content of Sn at a location (for example, a distance within 10 nm) spaced apart from a predetermined distance from the interface between the dielectric layer 111 and the first internal electrode 121 and/or the second internal electrode 122 is lower than that of the interface. When the region in which Sn has the maximum content is disposed at the interface between the dielectric layer and the internal electrode, a withstand voltage characteristic of the multilayer ceramic electronic component may be improved.

In the multilayer ceramic electronic component 100 according to the present disclosure, a first external electrode 131 and a second external electrode 132 may be disposed on an outer surface of the ceramic body 110. The first external electrode 131 may be disposed on the first surface S1 of the ceramic body 110 of the multilayer ceramic electronic component 100 according to the present disclosure, and the second external electrode 132 may be disposed on the second surface S2 of the ceramic body 110.

In one example, at least a portion of the first external electrode 131 of the multilayer ceramic electronic component 100 according to the present disclosure may be disposed to extend on the third surface S3, the fourth surface S4, the fifth surface S5, and the sixth surface S6 of the ceramic body 110. In addition, at least a portion of the second external electrode 132 may be disposed to extend on the third surface S3, the fourth surface S4, the fifth surface S5, and the sixth surface S6 of the ceramic body 110. In this case the first external electrode 131 and the second external electrode 132 may be disposed to be spaced apart from each other. When at least a portion of the first external electrode 131 and/or the second external electrode 132 is disposed to extend on the third surface S3, the fourth surface S4, the fifth surface S5, and the sixth surface S6 of the ceramic body 110, respectively, the extended portion may function as a so-called band portion, and the reliability of the multilayer ceramic electronic component 100 according to the present disclosure may be further improved by preventing moisture penetration, or the like.

The first external electrode 131 and the second external electrode 132 of the multilayer ceramic capacitor 100 according to the present disclosure may be sintered electrodes containing a conductive metal. The conductive metal may include one or more of copper (Cu), nickel (Ni), tin (Sn), palladium (Pd), platinum (Pt), iron (Fe), gold (Au), silver (Ag), tungsten (W), titanium (Ti), lead (Pb), and alloys thereof.

In addition, the first external electrode 131 and the second external electrode 132 may include glass. The glass may be a composition in which oxides are mixed, and may not be particularly limited, but may be one or more selected from a group consisting of a silicon oxide, a boron oxide, an aluminum oxide, a transition metal oxide, an alkali metal oxide, and an alkaline earth metal oxide. The transition metal may be selected from a group consisting of zinc (Zn), titanium (Ti), copper (Cu), vanadium (V), manganese (Mn), iron (Fe), and nickel (Ni), the alkali metal may be selected from a group consisting of lithium (Li), sodium (Na) and potassium (K), and the alkaline earth metal may be one or more selected from a group consisting of magnesium (Mg), calcium (Ca), strontium (Sr), and barium (Ba).

As an example of a method of forming the first electrode layer 131 and the second electrode layer 132, the first electrode layer 131 and the second electrode layer 132 may be formed by dipping a ceramic body 110 into a conductive paste containing conductive metal and then sintering the same, or formed by printing the conductive paste on the surface of the ceramic body 110 by a screen printing method or a gravure printing method and sintering the same. In addition, the first electrode layer 131 and the second electrode layer 132 may be formed by applying the conductive paste to the surface of the ceramic body or transferring a dried film obtained by drying the conductive paste onto the ceramic body and then sintering the same, but is not limited thereto. For example, it may be formed by a conductive paste on a ceramic body 110 and then sintering the same by various methods other than the above-described methods.

In another embodiment of the present disclosure, the first and second external electrodes 131 and 132 of the multilayer ceramic electronic component 100 may be resin-based electrodes including a conductivity imparting agent and a base resin. The resin-based electrode has a structure in which a conductivity imparting agent is dispersed in the base resin, and may be manufactured in an environment at a lower temperature than the sintered electrode, so that the conductivity imparting agent may exist inside the base resin in the form of particles. When the first and second external electrodes 131c and 132c are resin-based electrodes, physical stress such as external impact may be blocked.

The conductivity imparting agent may include conductive metal and/or a conductive polymer. The conductivity imparting agent may be, for example, one or more selected from a group consisting of calcium (Ca), titanium (Ti), molybdenum (Mo), tungsten (W), iron (Fe), cobalt (Co), nickel (Ni), palladium (Pd), platinum (Pt), copper (Cu), silver (Ag), gold (Au), zinc (Zn), aluminum (Al), tin (Sn), lead (Pb), alloys thereof, but an embodiment thereof is not limited thereto.

Also, examples of the conductive polymer may include, although not limited thereto, PT (poly(thiophene)), PEDOT (poly(ethylenedioxy) thiophene), PPS (poly(p-phenylene sulfide)), PANI (polyanilines), P3HT (poly(3-hexylthiophene-2,5-diyl)), PolyTPD (poly(4-butylphenyldiphenylamine)), PSS (poly(4-butylphenyldiphenylamine)), PVK (poly(9-vinylcarbazole)), PDBT (poly(4,4'-dimethoxy bithophene)), sulfur (S) and/or nitrogen (N)-containing compounds such as polypyrrole or polyaniline, and also include compounds including no hetero atom such as poly(fluorine), polyphenylene, polypyrene, polyazulene, polynaphthalene, PAC (poly(acetylene)), PPV (poly(p-phenylene vinylene), or the like, but an embodiment thereof is not limited thereto.

The first and second electrode layers 131 and 132 may include a conductive pillar such as carbon fillers such as carbon nanotubes, graphene, fullerene, and/or alloy fillers such as spherical-type, elliptical-type, flake-type, fibrous-type, or resinous (dendrite-type) as necessary, but is not limited thereto.

The base resin included in the first and second electrode layers 131 and 132 may be, for example, a thermosetting resin. Specific examples of the thermosetting resin may include a phenol resin, an urea resin, a diallylphthalate resin, a melanin resin, a guanamine resin, an unsaturated polyester resin, a polyurethane resin, an epoxy resin, an aminoalkyd resin, a melamine-urea cocondensation resin, a silicon resin, a polysiloxane resin, and the like, but are not limited thereto. When a thermosetting resin is used, a crosslinking agent, a curing agent such as a polymerization initiator, a polymerization accelerator, a solvent, a viscosity modifier, and the like may be further added and used as necessary.

As set forth above, according to one of the various effects of the present disclosure, high temperature and high pressure characteristics of a multilayer ceramic electronic component may be improved.

According to one of the various effects of the present disclosure, uniformity of a microstructure of a dielectric layer of a multilayer ceramic electronic component may be excellent and a secondary phase may be controlled.

According to one of the various effects of the present disclosure, insulation resistance characteristics of a multilayer ceramic electronic component may be improved.

According to one of the various effects of the present disclosure, reliability of a multilayer ceramic electronic component may be improved.

However, various and advantageous advantages and effects of the present invention are not limited to the above description, and will be more readily understood in the process of describing specific embodiments of the present invention.

While the embodiments have been illustrated and described above, it will be apparent to those skilled in the art that modifications and variations could be made without departing from the scope in the embodiment as defined by the appended claims.

What is claimed is:

1. A multilayer ceramic electronic component, comprising:
a ceramic body including a dielectric layer having a main component represented by $(Ba_{1-x}Ca_x)(Ti_{1-y}(Zr, Sn, Hf)_y)O_3$ (where, $0 \leq x \leq 1$, $0 \leq y \leq 0.5$), and having a plurality of grains and grain boundaries disposed between the plurality of grains, and including first and second internal electrodes alternately stacked with the dielectric layer interposed therebetween;
a first external electrode connected to the first internal electrode; and
a second external electrode connected to the second internal electrode,
wherein the dielectric layer comprises a triple point disposed in contact with three grain boundaries and a secondary phase of Si disposed inside the triple point,
wherein a dispersion of an Si content at an interface between the dielectric layer and the internal electrode is 1% by weight or less.

2. The multilayer ceramic electronic component of claim 1, wherein a ratio (b/a) of an average Si content (b) of the triple point to an average Si content (a) inside a grain of the plurality of grains is within a range of exceeding 3 and/or less than 6.

3. The multilayer ceramic electronic component of claim 1, wherein the dielectric layer comprises a first subcomponent including one or more of Y, Dy, Ho, Er, Gd, Ce, Nd, Sm, Tb, Eu, Tm, La, Lu, and Yb,
wherein a region in the dielectric layer, having a maximum content of the first subcomponent, is disposed in at least one of the grain boundaries.

4. The multilayer ceramic electronic component of claim 3, wherein a region in the dielectric layer, having a maximum content of the first subcomponent, is disposed in the triple point.

5. The multilayer ceramic electronic component of claim 1, wherein at least one of the plurality of grains has an average particle diameter of 300 nm or less.

6. The multilayer ceramic electronic component of claim 1, wherein the dielectric layer has an average thickness of 0.5 μm or less.

7. The multilayer ceramic electronic component of claim 1, wherein a secondary phase of Si at an interface between the dielectric layer and the internal electrode has an average content of 0.1 mol % or less.

8. The multilayer ceramic electronic component of claim 1, further comprising a non-detection region of a secondary phase of Si disposed at an interface between the dielectric layer and the internal electrode.

9. The multilayer ceramic electronic component of claim 1, wherein the dielectric layer comprises a second subcomponent including Mg,
wherein a secondary phase of Mg at an interface between the dielectric layer and the internal electrode has an average content of 0.1 mol % or less.

10. The multilayer ceramic electronic component of claim 1, wherein the dielectric layer and/or the internal electrode comprises Sn,
wherein a region in which a region in the dielectric layer and/or the internal electrode, having a maximum content of Sn, is disposed at an interface between the dielectric layer and the internal electrode.

11. The multilayer ceramic electronic component of claim 1, wherein the first internal electrode and/or the second internal electrode has an average thickness of 0.5 μm or less.

12. A multilayer ceramic electronic component, comprising:
a ceramic body including:
a dielectric layer including a main component, and a plurality of grains with grain boundaries disposed between the plurality of grains; and
first and second internal electrodes alternately stacked with the dielectric layer interposed therebetween,
wherein the dielectric layer comprises a triple point disposed in contact with three grain boundaries and a secondary phase of Si disposed inside the triple point,
wherein a dispersion of an Si content at an interface between the dielectric layer and the internal electrode is 1% by weight or less.

13. The multilayer ceramic electronic component of claim 12, wherein a ratio (b/a) of an average Si content (b) of the triple point to an average Si content (a) inside a grain of the plurality of grains is within a range of exceeding 3 and/or less than 6.

14. The multilayer ceramic electronic component of claim 12, wherein the dielectric layer comprises a first subcomponent including one or more of Y, Dy, Ho, Er, Gd, Ce, Nd, Sm, Tb, Eu, Tm, La, Lu, and Yb,
wherein a region in the dielectric layer, having a maximum content of the first subcomponent, is disposed in at least one of the grain boundaries.

15. The multilayer ceramic electronic component of claim 14, wherein a region in the dielectric layer, having a maximum content of the first subcomponent, is disposed in the triple point.

16. The multilayer ceramic electronic component of claim 12, wherein at least one of the plurality of grains has an average particle diameter of 300 nm or less.

17. The multilayer ceramic electronic component of claim 12, wherein the dielectric layer has an average thickness of 0.5 μm or less.

18. The multilayer ceramic electronic component of claim 12, wherein a secondary phase of Si at an interface between the dielectric layer and the internal electrode has an average content of 0.1 mol % or less.

19. The multilayer ceramic electronic component of claim 12, further comprising a non-detection region of a secondary phase of Si disposed at an interface between the dielectric layer and the internal electrode.

20. The multilayer ceramic electronic component of claim 12, wherein the dielectric layer comprises a second subcomponent including Mg,
wherein a secondary phase of Mg at an interface between the dielectric layer and the internal electrode has an average content of 0.1 mol % or less.

21. A multilayer ceramic electronic component, comprising:
a ceramic body including:
a dielectric layer including a main component, and a plurality of grains with grain boundaries disposed between the plurality of grains; and
first and second internal electrodes alternately stacked with the dielectric layer interposed therebetween,
wherein the dielectric layer comprises a triple point disposed in contact with three grain boundaries and a secondary phase of Si disposed inside the triple point,
wherein a secondary phase of Si at an interface between the dielectric layer and the internal electrode has an average content of 0.1 mol % or less, and
wherein a ratio (b/a) of an average Si content (b) of the triple point to an average Si content (a) inside a grain of the plurality of grains is within a range of exceeding 3 and/or less than 6.

22. The multilayer ceramic electronic component of claim 21, wherein the dielectric layer comprises a first subcomponent including one or more of Y, Dy, Ho, Er, Gd, Ce, Nd, Sm, Tb, Eu, Tm, La, Lu, and Yb,
wherein a region in the dielectric layer, having a maximum content of the first subcomponent, is disposed in at least one of the grain boundaries.

23. The multilayer ceramic electronic component of claim 22, wherein a region in the dielectric layer, having a maximum content of the first subcomponent, is disposed in the triple point.

24. The multilayer ceramic electronic component of claim 21, wherein at least one of the plurality of grains has an average particle diameter of 300 nm or less.

25. The multilayer ceramic electronic component of claim 21, wherein the dielectric layer has an average thickness of 0.5 μm or less.

26. The multilayer ceramic electronic component of claim 21, further comprising a non-detection region of a secondary phase of Si disposed at an interface between the dielectric layer and the internal electrode.

27. The multilayer ceramic electronic component of claim 21, wherein the dielectric layer comprises a second subcomponent including Mg,
wherein a secondary phase of Mg at an interface between the dielectric layer and the internal electrode has an average content of 0.1 mol % or less.

28. The multilayer ceramic electronic component of claim 21, wherein the dielectric layer and/or the internal electrode comprises Sn,
wherein a region in which a region in the dielectric layer and/or the internal electrode, having a maximum content of Sn, is disposed at an interface between the dielectric layer and the internal electrode.

29. The multilayer ceramic electronic component of claim 21, wherein the first internal electrode and/or the second internal electrode has an average thickness of 0.5 μm or less.

* * * * *